J. B. HEVERLING.
MOTOR DRIVEN VEHICLE.
APPLICATION FILED MAR. 23, 1910.
1,011,431.
Patented Dec. 12, 1911.
2 SHEETS—SHEET 1.
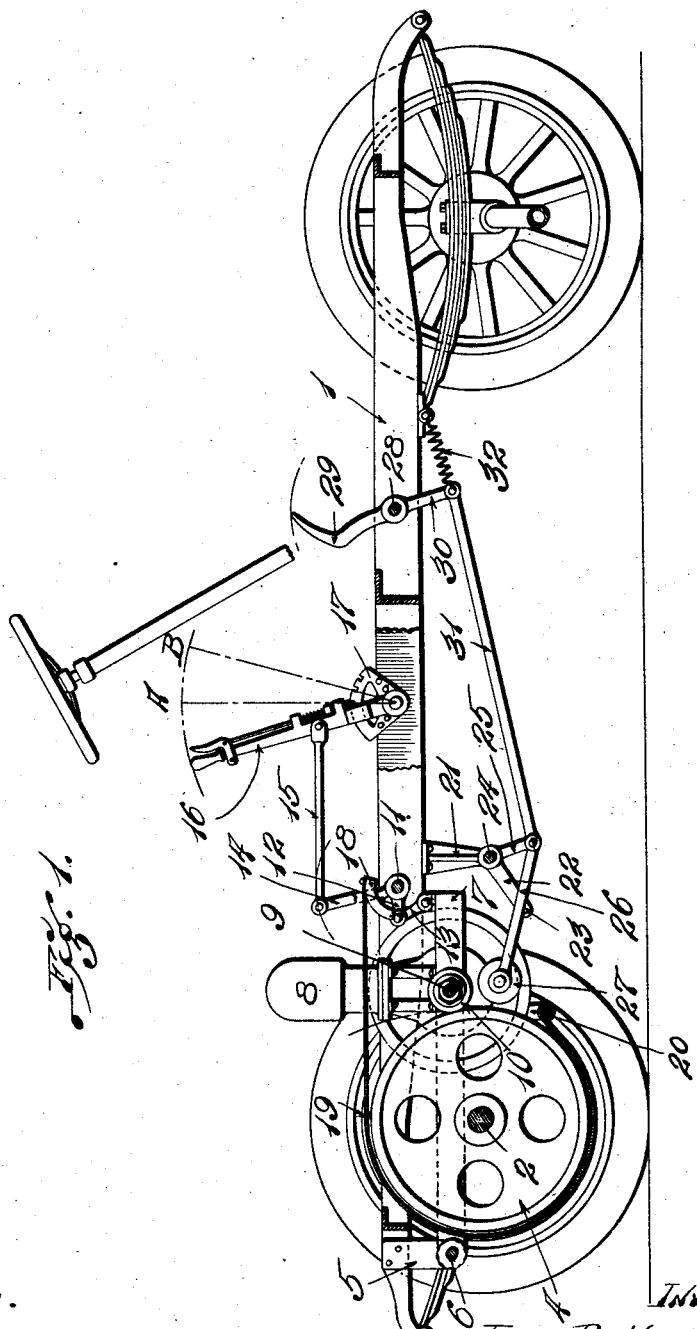

J. B. HEVERLING.
MOTOR DRIVEN VEHICLE.
APPLICATION FILED MAR. 23, 1910.
1,011,431.
Patented Dec. 12, 1911.
2 SHEETS—SHEET 2.
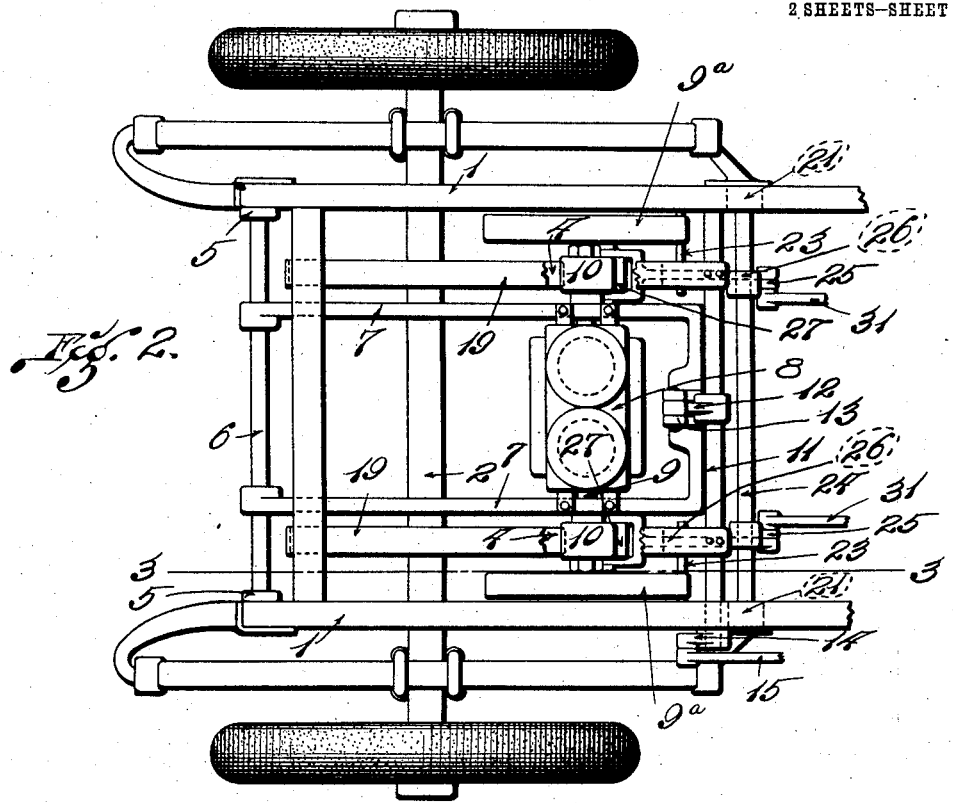
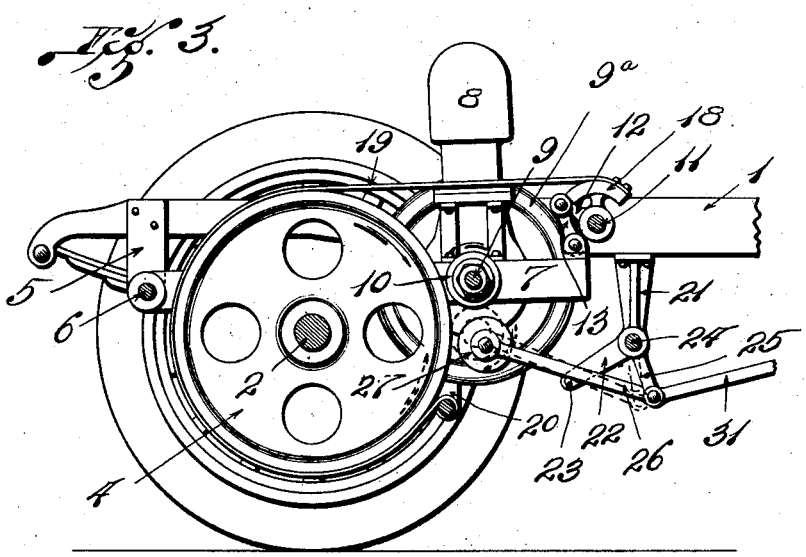
WITNESSES.
F. M. Harrington.
Wm. James.
INVENTOR.
JOHN B. HEVERLING.
By F. R. Cornwall. Atty.
COLUMBIA PLANOGRAPH CO., WASHINGTON, D. C.

UNITED STATES PATENT OFFICE.

JOHN B. HEVERLING, OF ST. LOUIS, MISSOURI.

MOTOR-DRIVEN VEHICLE.

1,011,431. Specification of Letters Patent. Patented Dec. 12, 1911.

Application filed March 23, 1910. Serial No. 551,136.

*To all whom it may concern:*

Be it known that I, JOHN B. HEVERLING, a citizen of the United States, residing at St. Louis, Missouri, have invented a certain new and useful Improvement in Motor-Driven Vehicles, of which the following is a full, clear, and exact description, such as will enable others skilled in the art to which it appertains to make and use the same, reference being had to the accompanying drawings, forming part of this specification, in which—

Figure 1 is a vertical section taken lengthwise through the center of a motor driven vehicle of my improved construction. Fig. 2 is a plan view of the rear portion of my improved motor driven vehicle, showing the motor and the driving mechanism. Fig. 3 is a vertical section taken approximately on the line 3—3 of Fig. 2.

My invention relates to a motor driven vehicle, the object of my invention being to provide simple means for driving a vehicle, which means is so arranged as to do away entirely with the use of toothed gears, driving chains, and the like between the motor and the driven axle of the vehicle.

In my improved construction I propose to mount the motor on a swinging frame to equip the driving shaft of the motor with one or more friction driving wheels, which are adapted to bear against the peripheries of large friction wheels mounted directly upon the driven axle of the vehicle, thus providing a direct friction drive, which does away with all intermediate driving mechanism, thereby greatly simplifying and cheapening the cost of a motor driven vehicle.

Further objects of my invention are to provide simple means in the form of band brakes for stopping the forward movement of the vehicle, to provide simple means for elevating the motor carrying frame, and to provide simple means for reversing or backing up the vehicle without changing the direction of movement of the driving shaft of the motor.

My invention consists in certain novel features of construction and arrangement of parts hereinafter more fully described and claimed.

Referring by numerals to the accompanying drawings, 1 designates the frame of the vehicle, which may be of any suitable type and mounted in the usual manner upon the usual vehicle wheels and axles. Fixed on the rear axle 2 and preferably at equal distances from the center thereof are large friction wheels 4. Supported in suitable hangers 5 at the rear end of the frame 1 is a transversely disposed shaft 6 and carried thereby is the rear end of a horizontally disposed frame 7, which extends forwardly over the rear axle between the friction wheels 4 and carried by the forward portion of said frame is a motor 8. As shown in the drawings this motor is in the form of an internal combustion engine, having one or more cylinders, but it will be readily understood that an electric motor may be utilized, and where the latter construction is carried out suitable storage batteries are carried on the vehicle for supplying current to the motor.

9 designates the driving shaft of the motor and fixed thereon are small friction wheels 10 which are adapted to bear against the peripheries of the friction wheels 4. Fly wheels $9^a$ are fixed on the ends of the motor shaft, and are for the purpose of causing said shaft to run evenly and to develop momentum.

Journaled in the frame 1 immediately in front of the motor carrying frame 7 is a transversely disposed shaft 11, and fixed to the central portion thereof is a short arm 12, the rear end of which is pivotally connected to a vertically disposed link 13, the lower end of which is pivotally connected to the frame 7. Fixed to one end of the shaft 11 is an upwardly projecting lever 14 to the upper end of which is pivotally connected a horizontally disposed rod 15 the forward end of which is pivotally connected to a hand lever 16, fulcrumed at its lower end to the side of the frame 1, and said hand lever is provided with a latch which is adapted to engage in the notches of a segment 17. Fixed on the shaft 11 at points in alinement with the friction wheels 4 are upwardly projecting segmental blocks 18, and fixed to the forward ends of these blocks are the ends of flexible steel bands 19 which extend rearward around and beneath the friction wheels 4, and the lower ends of said bands are fixed to brackets 20 depending from the frame of the vehicle. These flexible steel bands perform the function of band brakes, and when the shaft 11 is rocked to move the segmental blocks 18 forwardly said band brakes frictionally engage the peripheral surfaces of the friction wheels 4.

The reversing mechanism will now be described. Depending from the sides of the frame 1 adjacent the ends of the shaft 11 are hangers 21, and formed integral with the lower ends of said hangers are arms 22 which project downwardly and rearwardly, and carried by the lower ends of said arms and projecting inward are pins 23. Journaled in the lower ends of the hangers 21 is a transversely disposed shaft 24, and fixed thereon and depending therefrom are arms 25. Pivotally connected to the lower ends of these arms are rearwardly extending links 26, which rest upon the pins 23, and journaled in the rear ends of said links 26 are friction disks 27. These friction disks normally occupy positions immediately in front of the friction wheels 4, and immediately below the friction disks 10.

Journaled in the side rails of the frame 1 at a point in front of the operator's seat is a transversely disposed shaft 28 and fixed to and projecting upward therefrom is a foot lever 29. Fixed to this shaft and depending therefrom is a pair of short arms 30, and pivotally connected to the lower ends of these arms are the forward ends of rods 31, the rear ends of which are pivotally connected to the lower ends of the arms 25. Retractile coil springs 32 connect the lower ends of the arms 30 with the frame 1, and normally hold the parts in the positions seen in Fig. 1 with the friction wheels 27 away from the peripheries of the friction wheels 4.

It will be noted that the frame 7 in my improved motor driven vehicle is adapted to swing vertically with the shaft 6 as an axis, and owing to the location of said frame relative to the friction wheels 4, and the location of the motor upon said frame the small friction wheels 10 carried by the motor shaft occupy positions in front of the friction wheels 4, and for this reason the small friction wheels 10 move into engagement with the peripheries of the friction wheels 4 with a sliding or wedging movement. The weight of the forward end of the frame 7 and the motor carried thereby tends to force the small friction wheels 10 into frictional engagement with the wheels 4, and for this reason a very close frictional engagement is obtained.

When the hand lever 16 is moved to the position seen in Fig. 1 the shaft 11 is rocked so as to lower the forward end of the motor carrying frame 7, and the small friction wheels 10 engage the surface of the friction wheels 4, thereby imparting rotary motion thereto, and driving the machine forward. When the parts are thus positioned the segmental blocks 18 are rocked to their rearward limit of movement, thereby releasing the band brakes 19 from the peripheries of the friction wheels 4.

When it is desired to release the driving connection between the motor and the friction wheels 4 the hand lever 16 is moved forward until it occupies an approximate vertical position as shown by the dotted lines A Fig. 1, and such action partially rocks the shaft 11, thereby swinging the forward end of the motor carrying frame 7 upward, and thus drawing the small friction wheels 10 away from and out of frictional engagement with the friction wheels 4. This action takes place when it is desired to permit the vehicle to travel forward by momentum, or while said vehicle is traveling down an incline.

When it is desired to apply the brakes the hand lever 16 is moved forward to the position shown by the dotted line B, Fig. 1, and such action partially rocks the shaft 11, thereby moving the blocks 18 forward and consequently drawing the band brakes 19 into close engagement with the peripheries of the wheels 4, thereby causing said wheels to cease rotating.

To reverse the movement of the vehicle, or cause the same to travel backward the hand lever 16 is moved into the position shown by the dotted line A in Fig. 1, and the operator now engages the upper end of the foot lever 29 and moves the same forward. Such action partially rocks the shaft 28, thereby moving the rods 31 rearward and consequently moving the arms 26 rearward. The friction wheels 27 carried by the rear ends of said arms engage the peripheries of both the friction wheels 10 and 4, thus acting as intermediate wheels, and the rotary motion of the friction wheels 10 is imparted to the intermediate wheels 27, and from thence to the wheels 4, and as result said wheels 4 are rotated so as to move the vehicle rearward. When the operator removes his foot from the lever 29 the springs 32 draw the various parts of the reversing mechanism back to their normal positions.

The operating mechanism of a motor driven vehicle of my improved construction is very simple, and easily operated, in as much as, but one hand lever and one foot lever are employed.

The peculiar manner of mounting the motor, and the relative positions of the friction wheels 10 and 4 are important features of my improved construction, for by the employment of said features I am able to utilize the maximum power developed by the motor in driving the vehicle.

When the hand lever 16 is moved into the position shown by the solid lines in Fig. 1, and is set in such position the parts 12 and 13 perform the function of toggle levers to force the forward end of the frame 7 downward, thereby causing the small friction wheels 10 to bear tightly against the large friction wheels 4, and thus practically all of the power exerted by the engine upon the shaft 9 is transmitted to the friction wheels 4 and the rear axle 2.

It will be readily understood that minor changes in the form and construction of the various parts of my improved motor driven vehicle can be made and substituted for those herein shown and described without departing from the spirit of my invention.

I claim:

1. In a motor driven vehicle, a driving axle, a friction wheel carried thereby, a vertically moving motor driven friction wheel adapted to engage the surface of the first mentioned friction wheel, a band brake partially encircling the first mentioned friction wheel, and means for simultaneously elevating the motor driven friction wheel, and tightening the band brake on the first mentioned friction wheel.

2. In a motor driven vehicle, a driving axle, a friction wheel mounted thereon, a vertically moving motor, a friction wheel carried by the motor shaft, and adapted to engage with wedging action against the periphery of the first mentioned friction wheel, a band brake partially encircling the first mentioned friction wheel, and means for simultaneously elevating the motor and tightening the band brake on the first mentioned friction wheel.

3. In a motor driven vehicle, a driving axle, a friction gear mounted thereon, a vertically moving motor, a friction gear carried by the motor shaft, adapted to engage with wedging action against the periphery of the first mentioned friction gear, a band brake partially encircling the first mentioned friction gear, means for simultaneously elevating the motor, and tightening the band brake on the first mentioned friction gear, and intermediate friction gears adapted to be moved into position between the friction gear on the driving axle and the friction gear on the motor shaft.

4. In a motor driven vehicle, a driving axle, a pair of large friction wheels carried thereby, a pivotally mounted frame, a motor on said frame, small friction wheels on the motor shaft, which small wheels are adapted to frictionally engage the peripheries of the large friction wheels, means whereby the free end of the pivoted frame is elevated, and band brakes partially encircling the large friction wheels which band brakes are tightened when the motor carrying frame is elevated.

5. In a motor driven vehicle, a driving axle, having a friction gear thereon, a frame pivoted to the vehicle having a motor driven friction gear mounted thereon, a band brake surrounding the friction gear on the axle, and a lever connected with the free end of the frame and the band brake adapted to be positioned to disconnect the friction gears, and apply the brake or to connect gears and release brake.

6. In a motor driven vehicle, a driving axle, having a friction gear thereon, a frame pivoted to the vehicle having a motor driven friction gear mounted thereon, a band brake surrounding the friction gear on the axle and a lever connected with the free end of the frame and the band brake, adapted to be positioned to disconnect the friction gears and apply the brake, or to connect gears and release brake, or to disconnect gears and leave brake released.

7. In a motor driven vehicle, a driving axle, having a friction gear thereon, a frame pivoted to the vehicle having a motor driven friction gear mounted thereon, a band brake surrounding the friction gear on the axle and a lever connected with the free end of the frame and the band brake, adapted to be positioned to disconnect the friction gears and apply the brake, or to connect gears and release brake, or to disconnect gears and leave brake released, and means for moving an auxiliary friction gear into mesh with both friction gears.

8. In a motor driven vehicle, a driving axle, a friction gear mounted thereon, a motor driven friction gear, an intermediate friction gear adapted to be introduced between said first mentioned friction gears, said latter intermediate gear being mounted on an arm, a bracket having a pin attached for supporting said arm, and means on the vehicle whereby said intermediate gear may be positioned.

9. In a motor driven vehicle, a driving axle having a friction gear thereon, a frame pivoted to the vehicle having a motor driven friction gear mounted thereon, a band brake surrounding the friction gear on the axle, a lever connected with the free end of the frame and the band brake, adapted to be positioned to disconnect the friction gears and apply the brake, or to connect gears and release brake, or to disconnect gears and leave the brake released, an auxiliary friction gear, and means for moving said gear into mesh with both friction gears at the time that these gears are disconnected and the brake released.

In testimony whereof I hereunto affix my signature in the presence of two witnesses, this 19th day of March, 1910.

JOHN B. HEVERLING.

Witnesses:
M. P. SMITH,
L. CORRAO.

Copies of this patent may be obtained for five cents each, by addressing the "Commissioner of Patents, Washington, D. C."